United States Patent Office 2,939,962
Patented June 7, 1960

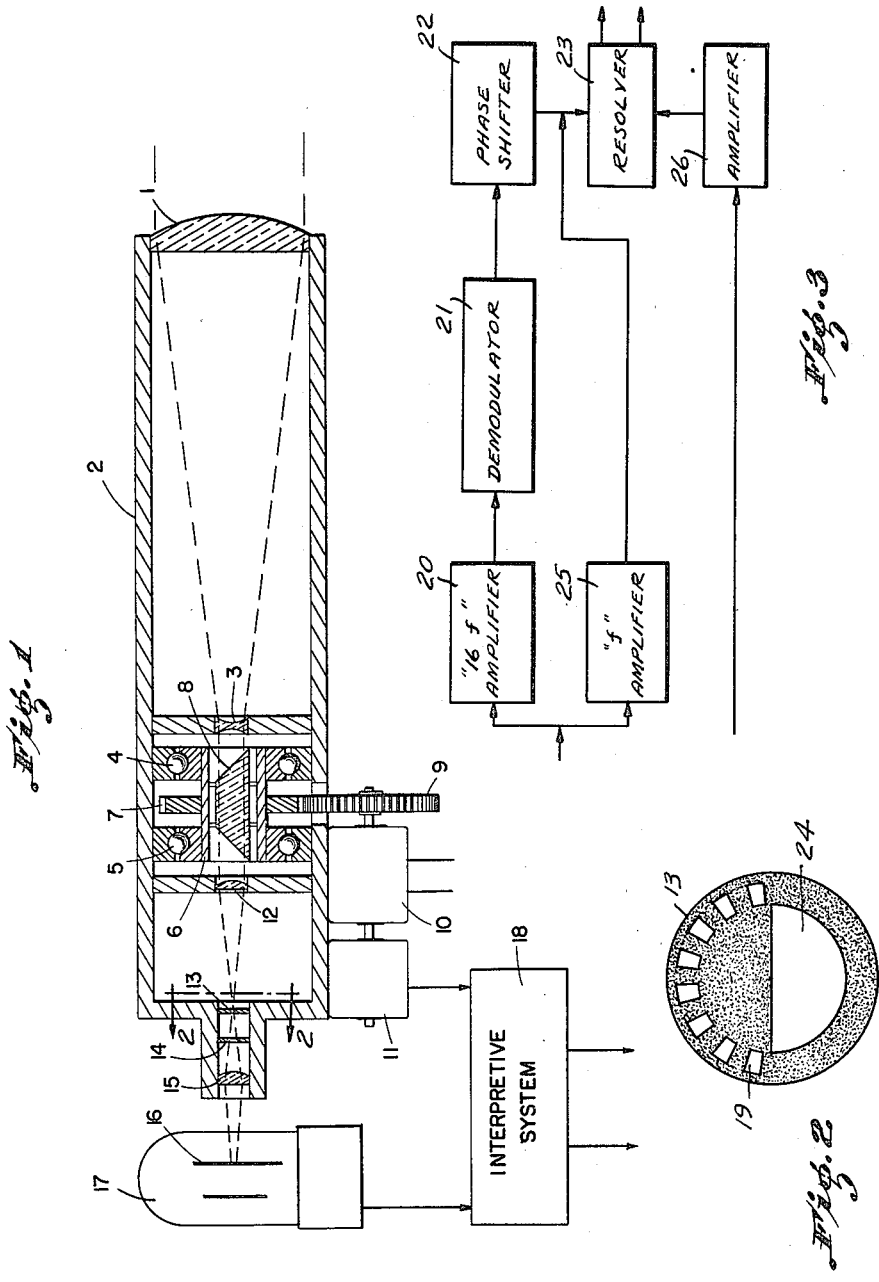

2,939,962
FIXED BEAM SCANNER

Victor A. Miller, Long Beach, Calif., assignor to North American Aviation, Inc.

Filed Jan. 28, 1952, Ser. No. 268,484

4 Claims. (Cl. 250—203)

This invention relates to star sensing systems, and particularly to a novel scanning device for detecting the angular displacement between the line of sight to a star and the optical axis of an optical system for gathering light from a star.

In patent application Serial No. 173,146, filed July 11, 1950, in the names of William B. Greenlee and Victor A. Miller, for "Star Sensing System," there is disclosed a scanning system in which a reticle is rotated in the path of light between an optical system and a photoelectric cell. In that system the objective image formed upon the cathode of the photo-multiplier moved as the reticle rotated, with the result that due to a variation in sensitivity of the cathode surface a modulated signal anomalous in character was produced. The motion of the beam over the grid wires of the tube also produced an anomalous signal. This invention contemplates the provision of a scanning system with which the outline of the sky light beam at the photoelectric cell is fixed in space.

It is therefore an object of this invention to provide a scanning system incorporating a fixed reticle, and means for presenting to said reticle a beam of light from a star, which beam rotates in space with a radius of rotation proportional to the deviation between the optical axis of the light-gathering system and the line of sight to a star.

It is another object of this invention to provide means for causing the image of a source of radiant energy to scan a fixed reticle.

It is another object of this invention to provide an improved light scanning device.

It is another object of this invention to provide a radiant energy source detector which is insensitive to uniform radiant energy gradient adjacent said source.

It is another object of this invention to provide a scanning device incorporating an optical device which is rotated to cause an image to scan in a circular pattern.

Other objects of invention will become apparent from the following description taken in connection with the accompanying drawings, in which Fig. 1 is a schematic diagram of the invention; Fig. 2 is a sectional view of the device shown in Fig. 1 taken at 2—2 in Fig. 1; and Fig. 3 is a block diagram of the interpretive system of this invention.

Referring to Fig. 1, there is shown an objective lens 1 for gathering light from a star, supported in a frame structure 2 which also supports the negative lens 3 and bearings 4 and 5 for a tube 6 rotated by a gear 7 and supporting dove prism 8, or other image-rotating device (such as a Schmidt prism, a Brashear-Hastings prism, or any optical device which gives a triple reflection of the radiant energy transmitted to it) and which is aligned with the optical axis of lenses 1 and 3. Gear 7 is driven by a gear 9 which in turn is driven by a motor 10 which also drives a generator 11. The end of frame structure 2 also supports a positive lens 12; a reticle 13 of the type disclosed in patent applications Serial No. 173,146, filed July 11, 1950, in the names of William B. Greenlee and Victor A. Miller, for "Star Sensing System"; Serial No. 246,728, filed September 15, 1951, in the names of William B. Greenlee and Victor A. Miller, for "Binocular Star Sensing System"; and Serial No. 268,483, filed January 28, 1952, now Patent No. 2,820,906 in the name of Victor A. Miller, for "Radiant Energy Sensing System"; an aperture stop 14; and lens 15. A typical reticle of this type is shown in Fig. 2. The purpose of the aperture stop is to make invariant the cross-section of the beam of radiant energy transmitted to the photoelectric cell hereinafter disclosed. Light is transmitted through these various lenses and the prism, and is finally focused upon cathode 16 of photomultiplier tube 17. The output signals from photoelectric cell 17 and from generator 11 are fed to an interpretive electronic system 18 of the general type disclosed in patent application Serial No. 173,146 for "Star Sensing System," or in patent application Serial No. 268,483, filed January 28, 1952, for "Radiant Energy Sensing System" by Victor A. Miller, whose function is to produce from the relative phase and frequency of the signals produced by generator 11 and photoelectric cell 17 an output signal indicative of the direction of displacement of the line of sight to the source of radiant energy from the optical axis of the various lenses described. This interpretive system is shown in detail in Fig. 3.

In operation, light from a star enters lens 1 and is converged upon lens 3 which renders the light parallel for its transmission through prism 8. A Schmidt, or dove prism has the property of rotating the light being passed axially through it at twice the rate of rotation of the prism about its own axis. Prism 8 is rotated about the optical axis by means of gears 7 and 9, and motor 10 at some arbitrary rate. The image passed through the prism is therefore rotated at twice that rate so that the image is caused to scan reticle 13 at twice the rate of rotation of the prism. If this scanning rate is taken as the fundamental frequency of the system, then the prism is rotated at one-half the fundamental frequency, and generator 11 is so driven by motor 10 as to yield a signal having a frequency equal to the fundamental rate. As in patent application Serial No. 173,146 for "Star Sensing System," the relation between the phase of the signal output of photoelectric cell 17 and that of generator 11 is compared by interpretive system 18 to achieve a measure of the direction in which the optical axis of the telescope is displaced from a line of sight to a star.

Referring to Figs. 2 and 3, if the image of the star falls within the compensating areas 19 the resultant photocell signal is amplified by amplifier 20 which is tuned to be responsive only to a frequency sixteen times the fundamental frequency of the system, and is fed by a demodulator to phase shifter 22 which in turn is connected to the input of resolver 23. The output of the resolver then indicates corrective action to be initiated in the direction necessary to bring the star image toward the center of the reticle. In a similar manner, if the star image is within primary area 24 of reticle 13, the frequency output of the photocell is amplified by amplifier 25 which is tuned to this fixed frequency and is fed to resolver 23; and since this signal is not phase shifted, corrective action is again undertaken to bring the star image back toward the center of the reticle. The other input to resolver 23, of course, is the output from generator 11 which is amplified in amplifier 26. A great variety of reticles may be utilized such, for example, as the reticle shown in Fig. 3 of Patent No. 2,513,367, issued July 4, 1950, to L. B. Scott for "Radiant Energy Tracking Apparatus." Other reticles well-known in the art may also be employed, provided only that the phase of the resultant photocell signal is indicative of the direction and displacement of the star image from the optical axis of the system.

If a reticle such as that disclosed in patent application

Serial No. 173,146, filed July 11, 1950, in the names of William B. Greenlee and Victor A. Miller, for "Star Sensing System" is employed, information is also available from the photocell to indicate not only the direction of such displacement, but also its magnitude. One advantage of this invention is that since reticle 13 is at all times stationary with respect to photoelectric cell 17, and since limiting aperture stop 14 is stationary, no anomalous signals are generated by virtue of rotation of the reticle and its movement with respect to the cathode of the photoelectric cell. Aperture stop 14 limits the outline in space of the beam transmitted by it to the photoelectric cell.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for modulating light from a star with a time phase indicative of the direction of departure of a line of sight to said star from an axis in space comprising an optical system for gathering light from a star, a rotatable prism in the path of said light having the property of rotating light transmitted by it at twice the angular rate of the prism, a photoelectric cell for receiving light transmitted by said optical system, a fixed compensated reticle interposed between said optical system and said photoelectric cell, a fixed limiting aperture stop interposed in said system, and means for rotating said prism about the optical axis of said optical system whereby the relative phase of the signal generated by said photoelectric cell with respect to the phase of rotation of said prism indicates the direction of departure of a line of sight to said star from the optical axis of said optical system.

2. An optical system for causing the image of a source of radiant energy to scan in a circular path of radius proportional to the angular deviation between a line of sight to said source and the optical axis of said system comprising a lens system for gathering light from a star, a dove prism rotatable upon the optical axis of said lens system, means for rotating said dove prism, optical means for forming an image of said source from light emergent from said prism, a fixed compensated reticle for receiving said image, a photoelectric cell for producing an electrical signal in response to light modulated by said reticle, an aperture stop for limiting the light beam transmitted to said photoelectric cell, and an interpretive system responsive to the signal from said photoelectric cell and to the phase of rotation of said prism for indicating the direction of angular deviation of the line of sight to said radiant energy source from the optical axis of said lenses.

3. An optical system for causing the image of a source of radiant energy to scan in a circular path with a time phase indicative of the direction of deviation of the line of sight to said source from the optical axis of said system comprising a lens system for gathering energy from said source, optical means rotatable upon the optical axis of said lens system for receiving radiant energy from said lens system and rotating it at twice the rate of said optical means, a lens system for forming an image of said source from light emergent from said optical means, a fixed compensated reticle for modulating radiant energy transmitted by said image-forming lens system while eliminating the effect of uniform background gradient adjacent said radiant energy source, a photoelectric cell for generating electrical signals in response to light modulated by said reticle, means for generating an electrical signal having a frequency equal to twice the rotative frequency of said optical means, and an electronic interpretive system for phase comparing the output of said photoelectric cell with the output of said generating means to thereby indicate the direction of deviation of a line of sight to said radiant energy source from the optical axis of said system.

4. Means for detecting the direction of deviation of the line of sight to a source of radiant energy in a background of random radiant energy of less intensity than said source from the optical axis of an optical system, comprising optical means for gathering radiant energy from said source, prism means rotatable about the optical axis of said optical means for rotating the radiant energy gathered by said optical means at twice its own rotative rate, a photoelectric cell for generating an electrical signal in response to radiant energy transmitted by said prism means, a compensated reticle and an aperture stop interposed between said photoelectric cell and said prism means, means for generating an electrical signal having a frequency proportional to the rotative rate of said prism means, and an interpretive system responsive to said generating means and said photoelectric cell for indicating the phase discrepancy between said generated signal and said photoelectric cell signal to thereby indicate the direction of deviation of said line of sight from said optical axis despite the presence of uniformly varied background radiation adjacent said source.

References Cited in the file of this patent

UNITED STATES PATENTS

| | | |
|---|---|---|
| 2,369,622 | Toulon | Feb. 13, 1945 |
| 2,447,344 | Kliever | Aug. 17, 1948 |
| 2,513,367 | Scott | July 4, 1950 |